United States Patent
Yuksel

(10) Patent No.: US 12,354,281 B2
(45) Date of Patent: Jul. 8, 2025

(54) SYSTEM AND METHOD OF FACIAL TRACKING IN VISUAL INSPECTION PROCESSES

(71) Applicant: Ali Faruk Yuksel, Battleboro, NC (US)

(72) Inventor: Ali Faruk Yuksel, Battleboro, NC (US)

( * ) Notice: Subject to any disclaimer, the term of this patent is extended or adjusted under 35 U.S.C. 154(b) by 0 days.

(21) Appl. No.: 18/416,172

(22) Filed: Jan. 18, 2024

(65) Prior Publication Data

US 2025/0014189 A1 Jan. 9, 2025

Related U.S. Application Data

(60) Provisional application No. 63/512,658, filed on Jul. 9, 2023.

(51) Int. Cl.
*G06F 3/01* (2006.01)
*G06T 7/20* (2017.01)
*G06T 7/70* (2017.01)

(52) U.S. Cl.
CPC .............. *G06T 7/20* (2013.01); *G06F 3/013* (2013.01); *G06T 7/70* (2017.01); *G06T 2207/30201* (2013.01)

(58) Field of Classification Search
CPC ... G06T 7/20; G06T 7/70; G06T 2207/30201; G06T 2207/10048; G06T 2207/20084; G06F 3/013

See application file for complete search history.

(56) References Cited

U.S. PATENT DOCUMENTS

| | | | | |
|---|---|---|---|---|
| 2008/0291008 A1* | 11/2008 | Jeon | ........................ | G06V 10/95 340/539.1 |
| 2021/0146934 A1* | 5/2021 | Inagaki | .................... | G06V 40/18 |
| 2021/0241011 A1* | 8/2021 | Cronje | ....................... | G06T 7/70 |
| 2021/0365702 A1* | 11/2021 | Edwards | .............. | G06V 10/143 |

* cited by examiner

*Primary Examiner* — Marcos L Torres
(74) *Attorney, Agent, or Firm* — Ashley D. Johnson; Dogwood Patent and Trademark Law

(57) ABSTRACT

The invention is a system and method of introducing an automated detection system for manual and semi-automated visual inspection processes. The system employs a facial tracking camera to monitor an operator's gaze direction and level of attention during the inspection process. One or more images of a subject are received, and facial landmarks/associated confidence values are output. The landmark points and any associated confidence values, and/or associated information, may then be input to another set of one or more models that may output any facial analysis quantity or quantities. The system can analyze the data and trigger an alert if it detects an attention lapse, allowing for immediate intervention.

12 Claims, 5 Drawing Sheets

SYSTEM AND METHOD OF FACIAL TRACKING IN VISUAL INSPECTION PROCESSES

CROSS-REFERENCE TO RELATED APPLICATIONS

The present application claims priority to U.S. Provisional Patent Application No. 63/512,658, filed Jul. 9, 2023, the entire content of which is incorporated by reference herein.

TECHNICAL FIELD

The presently disclosed subject matter relates generally to the field of visual inspection processes. More particularly, the presently disclosed subject matter is directed to a system and method of integrating facial tracking technology with the monitoring of operator attentiveness during various types of inspections.

BACKGROUND

Inspection of products in manufacturing, scientific, and industrial environments typically involve manual inspection of the finished product. The manual inspection can be carried out at, for example, an inspection station within the manufacturing environment and/or can occur while the part is at an assembly station, on a conveyor, or at any other point in the manufacturing process. Generally speaking, the term "part" or "parts" refer to a finished product, to an element of a finished product, or to any item subject to inspection. Conventionally, operators inspect parts as they move along a conveyor in between processing stations on an assembly line. Alternatively, products can be deposited directly with an inspector that performs a visual inspection on the products. In some cases, the operators may need to manipulate the parts, such as by manually lifting, agitating, and/or viewing the containers holding the parts. "Manual inspection" refers to inspection by a human, whether or not part is actually handled by a human operator. Operators will generally then remove or otherwise flag parts that are deemed defective.

Manual inspection generally relies on the level of the operator's skills and the operator's attention to detail, as well as other variables. To this end, efficient inspection by an operator during production processes can be instrumental in ensuring the quality of the production. For example, inspection during production processes helps control the quality of products by identifying defects, allowing operators to then fix the defect or discard the defective part. During production, the process of defect detection is essential for quality assurance (QA), gating and sorting on production lines, and is consequently useful in improving productivity, improving production processes, and working procedures, reducing defect rates, and reducing re-work and waste.

However, ensuring continuous operator attention during the visual inspection process has proven to be challenging. As a result, potential oversights and compromised quality control can occur. Thus, performing manual visual inspection in the pharmaceutical space is largely dependent on a well-trained and disciplined workforce. Human error reduction in pharmaceutical manufacturing has recently been a hot topic in the industry. Where humans are involved, the potential for human-related errors is also naturally present. However, human errors can be greatly reduced when ensuring that the right technical skills and personality traits are paired up with effective training and qualifications. Nowhere is this truer than in manual visual inspection, where attention to detail and knowing the right details to focus on are keys to many successful inspection outcomes.

To this end, it would be beneficial to provide an effective system and method using facial recognition technology to verify that an operator is actively performing appropriate actions (e.g., visual assessment) with the items under inspection.

SUMMARY

In some embodiments, the presently disclosed subject matter is directed to an automated attention detection system. The disclosed system comprises a tracking camera, tracking sensor, or both. The camera and/or sensor comprises a tracker configured to scan one or both eyes or the face of an operator to determine the position and orientation of the eye(s) and/or face. The system also includes a processing unit that determines tracking information based on the scanned light by generating and transmitting images of the eye(s) and/or face to a remote processing unit. The processing unit compares the eye and/or face tracking information and a tracking parameter to detect if eye and/or facial movement outside a predetermined range occurs beyond a threshold time. The attention level of the operator is detected based on the comparison. "Attention" refers to the attentiveness to the job the operator is performing (e.g., inspecting items for defects on a conveyor belt). A high level of attention correlates to the operator keeping visual contact on the workspace (e.g., machinery including a conveyor, samples positioned in front of the operator) such that the quality control of any produced products remains high. A low level of attention correlates to the operator breaking visual contact with the workspace such that products with defects or other negative qualities are approved such that quality control of the produced products is lower than optimal. "Quality control" refers to a system for ensuring the maintenance of proper standards in methods to determine whether the process exhibits nonrandom variation.

In some embodiments, the tracking camera or tracking sensor is positioned adjacent to a ceiling in a work environment of an operator.

In some embodiments, the tracking camera or tracking sensor is positioned as part of a conveyor belt apparatus.

In some embodiments, the tracking camera or tracking sensor is embedded with a conveyor belt (e.g., attached to or flush with a top surface of the conveyor belt) of a conveying apparatus.

In some embodiments, a direction of a gaze or the face of the operator is tracked (e.g., to determine if the operator is looking at a work space or away from a work space), a location of the center of an eye of the operator is tracked, an angle of the face, a position of the face, and/or a torsion of an eye of the operator is tracked.

In some embodiments, the tracker includes an illumination source selected from a laser, a light emitted diode, an organic LED, or a fiber light source.

In some embodiments, the camera or sensor is an infrared or near-infrared camera or sensor.

In some embodiments, the processing unit compares captured light information with a predetermined lookup table or a predetermined eye model to estimate tracking information of the operator's eyes and/or face.

In some embodiments, the system includes software algorithms to interpret the data from the tracking camera or tracking sensor to ascertain the direction of the operator's gaze and/or facial movement and the level of attention being paid by the operator.

In some embodiments, the presently disclosed subject matter is directed to a method of improving quality control or one or more products by an operator. Particularly, the method includes introducing the disclosed automated attention detection system to an environment adjacent to the operator to track the operator's gaze or facial movements. When movement outside a predetermined range is detected beyond a threshold time, a triggering event occurs. The triggering event is an event that increases a quality of the product such that the quality control of the one or more products is improved.

In some embodiments, the triggering event is selected from a stopping of a conveyor, a behavioral warning to the operator, sounding an alarm, flashing a light, a report of behavior to a supervisor, or combinations thereof.

DETAILED DESCRIPTION

Figure 1:
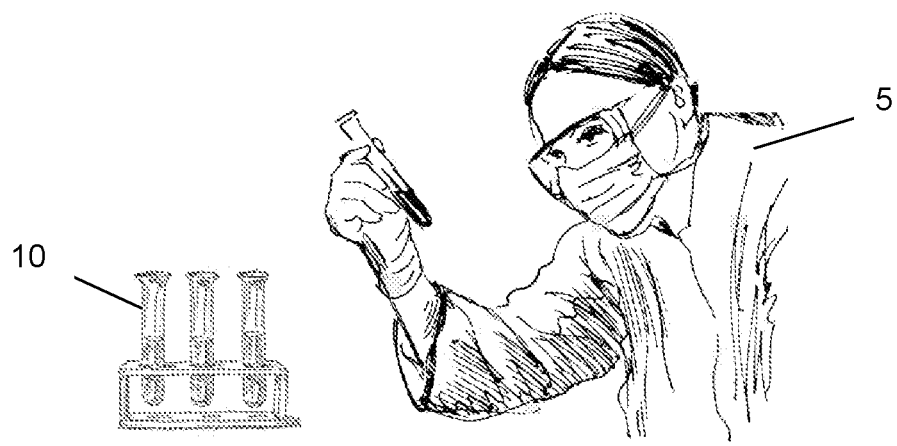
FIG. 1 is a perspective view of a conventional visual inspection system in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is generally directed to a system and method of improving manual quality control of one or more products using facial tracking technologies. Particularly, the presently disclosed subject matter includes introducing an automated attention detection system configured to monitor an operator's facial orientation (e.g., including gaze direction) and/or level of attention during manual and semi-automated visual inspection processes. "Manual visual inspection" refers to the inspection of equipment and/or products using one or more human senses, such as vision, hearing, touch, smell, and/or any non-specialized inspection equipment. As illustrated in FIG. 1, manual inspection typically involves an inspector 5 viewing and/or handling a sample 10 of material or equipment to determine the presence of flaws or inconsistencies. Any suitable inspection technique can be used, such as (but not limited to) one or more of visual inspection (e.g., color, cloudiness, clarity, the presence/absence of particulates, and the like), smell, sound, etc. If a particular sample fails to meet a threshold standard, the sample is flagged, and secondary action is taken.

Figure 2:
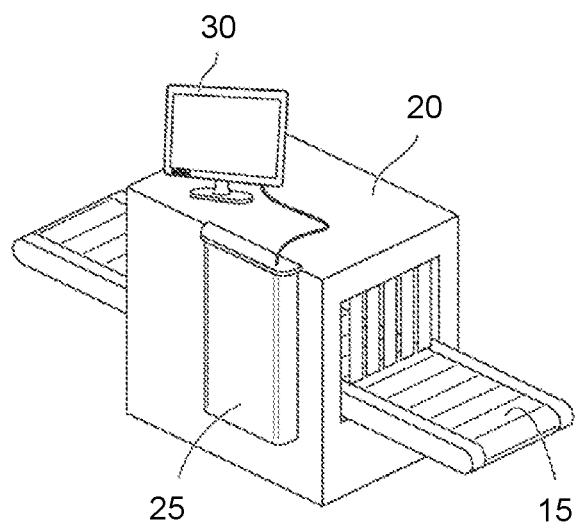
FIG. 2 is a perspective view of a conventional semi-automated visual inspection system in accordance with some embodiments of the presently disclosed subject matter.

"Semi-automated visual inspection" refers to any type of visual inspection that includes one or more human senses (e.g., vision) paired with inspection equipment, such as (but not limited to) ultrasound, X-ray, infrared, and the like. One representative example is illustrated in FIG. 2, showing a scanning device comprising a conveyor 15 that passes samples through a testing region 20 where a processor 25 applies, x-ray, light, sound, etc. such that the samples can be viewed directly or via monitor 30 by an inspector. As illustrated, the conveyor includes two or more pulleys (not shown) with a closed loop of belt that rotates around the pulleys. Samples 10 are positioned on the top face of the belt and travel along the length of the conveyor. One or more inspectors 5 are positioned around, below, and/or above the conveyor to easily access and/or visualize the samples as they travel along the conveyor. Alternatively or in addition, the inspection can occur via monitor 30. In this way, the operator can remove or detect a defective product from the conveyor. It should be appreciated that the disclosed system and method are not limited to environments that include conveyor belts. Rather, the presently disclosed subject matter can be used with any situation that includes distribution, warehousing, production, and/or manufacturing of a product requiring inspection. If a flaw or defect is noticed, the inspector can halt the conveyor or take other specified action.

By using facial tracking technology, the disclosed system ensures that operators remain focused on the inspection process and offers real time intervention mechanisms in situations of detected attention lapses. As a result, reliability and effectiveness of the visual inspection process is greatly enhanced and continuous quality control is ensured.

Advantageously, the system includes real-time analysis to analyze the operator facial features during use. For example, facial landmarks are detected and processed. "Facial landmarks" refer to one or more features of the operator used to assess the attention level of the operator. In some embodiments, the facial landmarks can be derived from a respective facial image of the operator (e.g., a photograph, 3D image). One or more machine learning models can receive as input an image of an operator and output both facial landmarks and associated confidence values. Confidence values represent the degrees to which portions of the operator's face corresponding to those landmarks are occluded (i.e., the amount of uncertainty in the position of each landmark location). The landmark points and the associated confidence values, and/or associated information, may then be input to another set of one or more machine learning models which may output any facial analysis quantity or quantities, such as the subject's gaze direction, head pose, drowsiness state, cognitive load, and/or distraction state.

It should be appreciated that machine learning can be used to determine the level and direction of attention of an operator, but the presently disclosed subject matter is not limited to machine learning methods. However, any method of identifying the level and direction of attention of an operator can be used.

Thus, a sensor (such as a camera) that captures images of an operator can transmit image data from captured images to a face detection module that detects the face of the operator in the image. The face detection module may be any software module or set of instructions capable of locating subject faces within an image using any method or process, including known computer vision-based face detection processes that detect faces without using neural networks, such as edge detection methods, feature searching methods, probabilistic face models, graph matching, histograms of oriented gradients (HOGs) fed into classifiers such as support vector machines, HaarCascade classifiers, and the like. Determining face location may also be performed using neural network-based facial recognition methods such as those employing deep neural network (DNN) facial recognition schemes, as well as any others.

Detected faces may then be cropped for input to a facial landmarks network. In this manner, a portion of the image or image data from the camera is selected for input to the facial landmarks network. Sections of the image may be selected, for example, by cropping the identified face according to a bounding box which may be drawn in known manner.

The cropped face portion can be transmitted to a facial landmarks network that determines facial landmarks and corresponding confidence values. The facial landmarks network may be any machine learning network (e.g., any one or more machine learning models capable of determining facial landmarks from an input image of a face). Such networks may include machine learning models built according to holistic methods to represent global facial appearance and shape information, models build according to constrained local model methods that build local appearance models in addition to utilizing global shape models, generative networks, CNNs, and regression-based models that determine landmark positions as functions of facial shape and appearance information. Many such models are known, and embodiments of the disclosure contemplate use of any one or more such models, or any other suitable models or methods, to determine facial landmarks from an input image of a face. Models may be constructed using any architecture and methods suitable for determining facial landmarks from input images of faces. For example, facial landmarks networks based on CNNs may be structured using any convolution kernels and pooling layers suitable for extracting features of a face for determination of corresponding landmark points.

The models may further be modified to generate as output a confidence value for each output facial landmark. Such confidence values correspond to detection probabilities of each landmark, that is, the likelihood that a landmark point is actually located at the facial feature that it is supposed to represent. The probability or confidence value of each landmark may thus indicate the level of occlusion for that particular facial region, as greater occlusion (i.e., lower visibility) of a facial feature corresponds to lower likelihood of correctly placing a landmark at that feature. As one example, when the facial landmarks network employs a classifier to determine landmark positions, confidence values may be or correspond to confidence scores generated by the classifier in determining landmark classifications.

For an input image of an operator's face, the outputs of the facial landmarks network can be a set of landmark points (i.e., two-dimensional positions of features of the operator's face) and a confidence value for each landmark point. The outputs are then sent to any number and type of networks, models, or other software modules, to serve as input. Such networks may include, as examples, a gaze network for determining the gaze direction of the subject, a head pose network for determining the head pose of the subject in the image, and/or a drowsiness model for determining a likelihood that the subject is in a sleeping or incapacitated state.

For example, during operation, the system transiently detects facial features such as the eyes, nose, and mouth, and tracks their relative positions and movements. This includes monitoring eye openness, gaze direction, and blink rate. Alongside facial feature tracking, the system transiently assesses head orientation and movements. It recognizes standard head postures associated with attentive behavior and flags significant deviations from these postures as potential inattention by an operator.

Embodiments of the disclosure also contemplate any other networks that may have facial landmarks as inputs. Confidence values may also be input to the face detection module as a form of feedback, to improve the selection of face portions and thus improve the generation of landmark points. In particular, face detection module may select only those face portions that correspond to sufficiently high confidence values, i.e., may select only sufficiently non-occluded portions of the subject's face for drawing of bounding boxes and face cropping. This may result in more accurate or reliable determination of landmark points.

The system uses pre-set, dynamic criteria to identify inattention, such as prolonged diversion of gaze or abnormal head movements. These criteria are based on the transient analysis of facial and head movements. Once the system transiently identifies behavior matching inattention parameters, it triggers an immediate response, like an alert or a system pause. This response is based on real-time analysis.

In some embodiments, the system can leverage existing algorithms capable of identifying key facial features and movements. The algorithms are designed to operate instantaneously and transiently, allowing for the real-time analysis of an operator's facial features.

The attention level of an operator refers to the degree to which the operator should pay attention to the surrounding work area (e.g., products on a conveyor belt, an equipment monitor, a sample of test tubes, etc.). In some embodiments, an attention level is computed for the operator at a specific time. Optionally, the operator's attention level refers to a specific token instance or group of token instances. In one example, the attention level is stored as a time series on a scale from no attention being paid to full attention is being paid. In some embodiments, attention level data is extracted from a visual attention data source (e.g., facial tracking as described below).

As noted above, the disclosed system includes a tracking camera and/or sensor positioned such that it has a clear view of the operator's face during the inspection process. The term "tracking camera" or "tracking sensor" refer to one or more cameras or sensors that measure the point of gaze (where an operator is looking) and/or the motion of the operator's face (e.g., looking at or away from the workspace). Generally, cameras include any device or component capable of acquiring an image of an object of interest, such as high resolution cameras, video cameras, wide angle cameras, telephoto cameras, visible light cameras, low light cameras, UV cameras, and the like. Similarly, sensors include any collector of information and/or data (e.g., optical sensors that convert an optical image into an electronic signal).

Figure 3A:
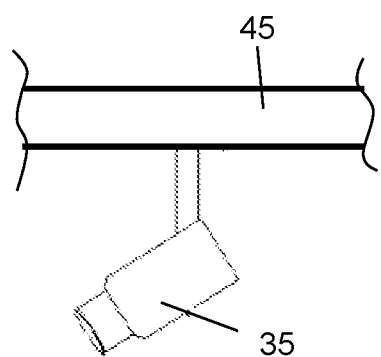
FIG. 3a is a front plan view of a camera positioned adjacent to an environment ceiling in accordance with some embodiments of the presently disclosed subject matter.
Figure 3B:
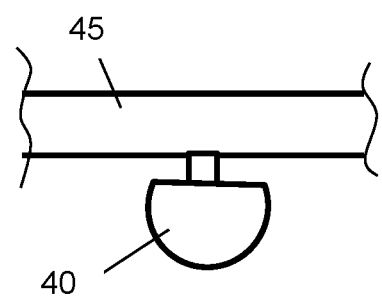
FIG. 3b is a front plan view of a sensor positioned adjacent to an environment ceiling in accordance with some embodiments of the presently disclosed subject matter.
Figure 3C:
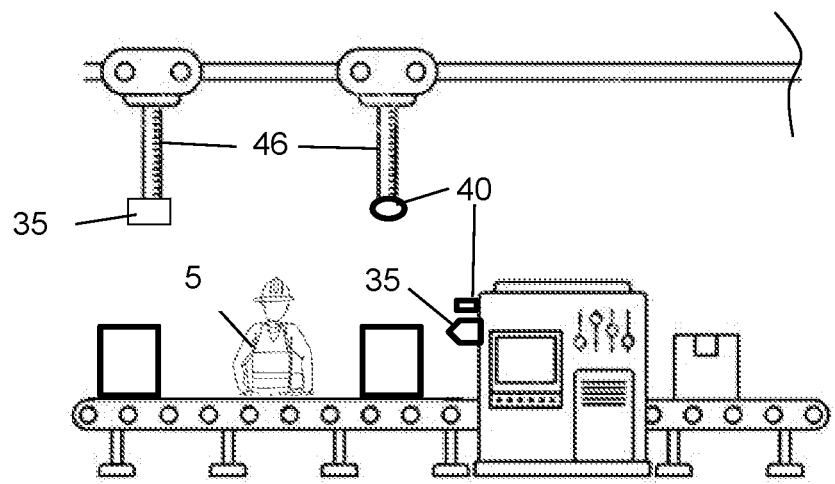
FIG. 3c is a front plan view of an environment comprising multiple cameras and sensors in accordance with some embodiments of the presently disclosed subject matter.
Figure 3D:
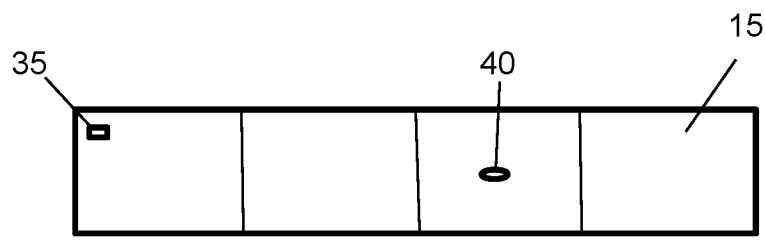
FIG. 3d is a top plan view of a conveyor belt comprising a camera and a sensor in accordance with some embodiments of the presently disclosed subject matter.

In some embodiments, the tracking camera 35 and/or sensor 40 can be positioned in the ceiling 45 of a work environment, as shown in FIGS. 3a and 3b. However, the presently disclosed subject matter is not limited and the camera and/or sensor can be positioned at any desired location in the environment. For example, the camera and/or sensor can form part of a conveyor system via one or more mounts 46 or on associated conveyor equipment, as shown in FIG. 3c. In still other embodiments, the conveyor (e.g., the top surface of the belt) can include one more gaze tracking sensors or cameras embedded into the belt itself, as illustrated in FIG. 3d. The sensor or camera can be approximately centrally located (e.g., to provide a unique viewpoint of the operator) or located adjacent to an edge of the conveyor (to ensure the view is not blocked by products 15, or at any desired belt location (e.g., on a laboratory workbench). The positions and locations of the cameras and/or sensors can be varied as desired by the user. In some embodiments, more than one sensor or camera can monitor an operator. Likewise, a single camera or sensor can monitor more than one operator in some embodiments.

It should be appreciated that the camera may be positioned at any location that allows it a view of the operator. Accordingly, the camera may capture images of the operator and transmit them to a computing device that calculates corresponding landmark and confidence values of the subject. The workspace may include a gaze network to determine resulting subject gaze direction. The gaze direction may then be transmitted to, for example, a software module that determines actions to take in response. For instance, the system may determine that the gaze direction represents a distracted operator and may initiate any type of operation in response. Such operations may include any type of warning (e.g., a visual or audible warning, a warning on a heads-up display, or the like), a braking operation, or any other action. The computing device may be positioned within the system as a local processor, or may be a remote processor that receives images from the camera and transmits gaze directions or instructions wirelessly to the system.

The camera or sensor can identify key facial features and track head and eye movement to determine a level of operator focus or attention level. "Tracking" thus includes the process of measuring the point of gaze (where the operator is looking), the angle of the user's head, the direction of the user's head, any sudden head movements, and the like. In some embodiments, the tracking can include detecting the direction of an operator's gaze, which may comprise detecting the angular orientation of the operator's eyes or face in three-dimensional space.

The tracking measurements can be accomplished using a tracker positioned as a part of camera 35 and/or sensor 40 that records the position of the face of an operator and the movements the face makes. For example, the tracker can detect if the operator's eyes stray from the workspace, if the operator raises their eyebrows, if the operator lowers their head, etc. In some embodiments, the tracker can include an eye tracker configured to scan the retina of an operator and detect the scanned light reflected from the retinal region. The scanned or tracked information can be compared to characterize the eye movements of the user based on the comparison. The eye tracking data can be paired with the face tracking information to give an accurate picture of the attentiveness of the operator.

The tracking unit component 41 of the camera or sensor uses the tracked eye and/or face movement to determine eye or face tracking information. Eye tracking information describes the position or orientation of an operator's eye. The eye tracking unit may use the determined eye tracking information to estimate eye tracking values, such as a gaze position (e.g., where the user is looking) and gaze time (how long the user is looking in a particular direction). Determined eye tracking values can then be included in the eye tracking information to provide information about attention level. Similarly, facial tracking information describes the angle, position, or orientation of the operator's head by using calculated angles and positions and comparing the data with optimal head/face comparable values or standards to determine an attention level of the operator.

Figure 4:
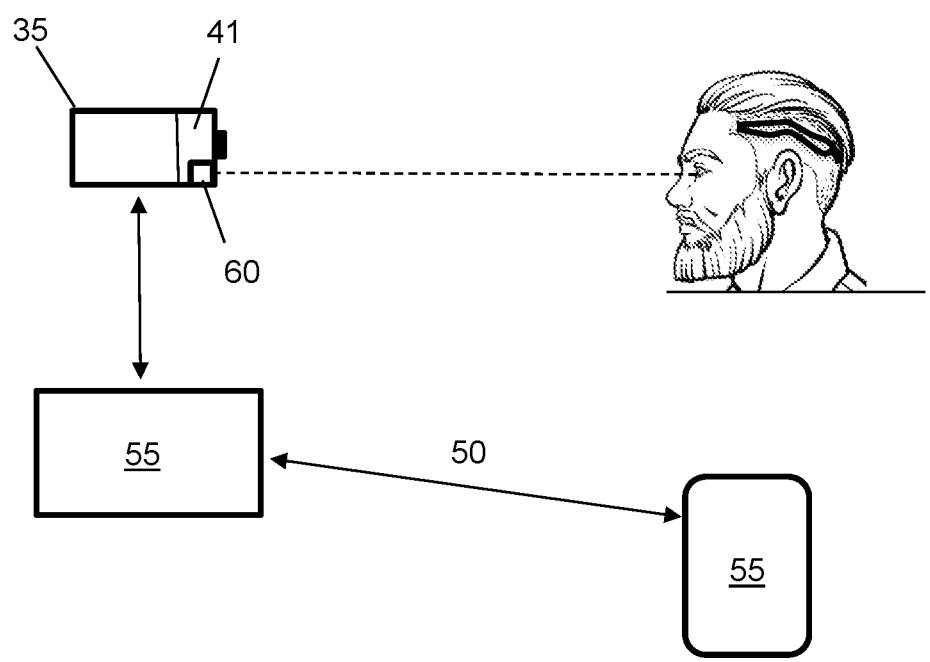
FIG. 4 is a schematic illustrating visual tracking in accordance with some embodiments of the presently disclosed subject matter.

The tracking component can include an optional illumination source 50, as shown in FIG. 4. For example, near-infrared light from a source can be directed toward the operator's face (e.g., center of the eyes), causing detectable reflections in both the pupil and cornea. The reflections can be tracked by an infrared or near-infrared camera or sensor 35, 40 oriented to view the eye and/or iris. The predetermined illumination power is less than the threshold that causes injury to the eye. Further, the illumination power is typically invisible to the human eye, and therefore less likely to interfere with the operator's job or be a distraction. The illumination source can be part of the camera or sensor, or a separate and free-standing or mounted component of the system.

Examples of suitable illumination sources can include (but are not limited to) one or more lasers (e.g., a tunable laser, a continuous wave laser, a pulse laser, other suitable laser emitting infrared light), light emitted diode (LED), organic LEDs (OLED), and/or fiber light source. The intensity of the illumination sources can be controlled based on target brightness levels sensed within the camera or sensor's field-of-view, e.g., as described in U.S. Pat. No. 8,890,946, the entire disclosure of which is expressly incorporated by reference herein.

In some embodiments, the camera or sensor is configured to capture images of the illuminated portion of the eye. In other embodiments, the camera or sensor can be configured to capture information and images about the operator's entire face. The system can include a processing unit 55 that determines tracking information based on captured image(s) from the camera or sensor. Thus, the processing unit can generate and transmit (via communications link 60) codes or images of the eye to remote processing unit 55 that is coupled or functionally coupled to a source and/or receiver of secure information. Transmissions via the communications link between the processing unit can be encrypted and can employ combinations of both wired and wireless transmission methods. The processing unit can therefore generate and transmit information on whether the operator is looking towards the workspace (e.g., conveyor belt) or away from the workspace past a predetermined time (e.g., past a threshold amount of time).

The processing unit 55 can be a field-programmable gate array (FPGA), microcomputer, microcontroller, application specific integrated circuit (ASIC), or other computing device. The processing unit can be a single device or processing functions can be performed by an assembly of separate physical devices.

In some embodiments, the processing unit can compare captured information (e.g., reflections of the eye and/or distortions of a structured light pattern projected onto the eye, head movement, head angle) with a predetermined lookup table or a predetermined eye model to estimate facial tracking information as it relates or correlates to attention level. For example, if a user is looking at a workspace, the structured light pattern has a first value, and if the user looks away from the workspace, the structured light pattern has a second value. The second value can increase compared to the first value the longer the operator looks away from the workspace.

In some embodiments, a predetermined lookup table or a predetermined eye model describes the relation between captured light information and eye tracking information. A lookup table refers to an array or matrix of data that contains items that are searched, such as discrete values of measured reflections of the eye and/or or distortions of a structure light pattern projected onto the eye from illumination source 40 measured over a period time. The tables can also include head angles as they relate to line of vision looking at or away from a workspace. Lookup tables may be arranged as key-value pairs, where the keys are the data items being searched (looked up) and the values are either the actual data or pointers to where the data are located. An eye model describes a model that is capable of expressing various eyes with a small number of parameters using discrete values of measured reflections of the eye and/or or distortions of a structure light pattern projected onto the eye from an illumination source of various different users. In some embodiments, comparing a worker's discrete values of measured reflections, head angle, head rotations, or distortions to the table or to the eye model gives an indication of the amount of the time the operator is looking at the workspace versus how often the operator was looking away from the workspace to determine an attention level.

Information such as face rotation can be derived from changes in sensed reflections. Video-based trackers may use the center of the pupil or center of the face as features to track over time. More sensitive types of trackers may use reflections from the front of the cornea and the back of the lens as features to track. The vector between the eye or face center and the corneal reflections can be used to compute the point of regard on surface or the gaze direction. A simple calibration procedure of the individual is typically needed before using the tracker to measure changes in gaze direction. Please see, for example, U.S. Pat. No. 9,733,703, incorporated herein by reference in its entirety.

The system can further include software algorithms designed to interpret the data from the facial tracking camera to ascertain the direction of the operator's gaze and the level of attention being paid to the inspection process. In some embodiments, the processing unit (e.g., computer) receives images from the camera or sensor, and determines eye position based on at least one of the images. The computer can calculate one or more values related to the operator's face based on measurements of reflections taken, such as identification of the light source emitting the light, intensities of the corresponding measured reflections, changes in facial movement, tilt, rotation. In this step, the computer can calculate one or more values related to the face, such as eye position, facial movement, head tilt, and/or eye movement velocity. The computer can then combine the measurements to determine whether the operator is looking away from the workspace past a threshold time, triggering a determination that the operator is not being optimally productive.

Particularly, if the system determines that an operator is looking away from a set location (e.g., in or around the area of the conveyor or computer monitor) for at least a threshold time, the system can then trigger an event. The threshold time can include any desired time, such as at least about 0.1 seconds (i.e., the duration of a rapid blink) and 10 seconds. In some embodiments, the threshold time is set for the entire duration of an operator's shift. In other embodiments, the threshold time can be varied depending on one or more elements (e.g., length of time monitoring the conveyor belt, number of prior triggering events, and the like).

In some embodiments, the triggering event occurs if a set number of incidents occur (e.g., an operator looks away from the workspace more than 3 times in a 15 minute interval).

In some embodiments, the outputs of a gaze network or determination, head pose network or change/determination, and drowsiness model or determination may be transmitted to any system or module. For example, the outputs of the networks may be transmitted to a visualizer that can be any display suitable for displaying electronic information. The visualizer can display the outputs of the gaze network, head pose network, and drowsiness model in graphical or visual form, and/or may display alerts, warning messages, or any other indicators based on these outputs, so that users may see the indicators and react accordingly.

In a typical application, an operator is positioned adjacent (e.g., in front of) a conveyor belt, objects to be inspected, or a monitor (a workspace) that provides items for visual or semi-automatic inspection. The facial tracking camera monitors the face of the operator as noted above to determine whether the operator is watching the items as they move by or if the operator's gaze is elsewhere (away from the workspace). In some embodiments, the camera or sensor continually monitors the operator. In other embodiments, the camera or sensor monitors the operator at predetermined time intervals (e.g., 15 minutes on, 15 minutes off). In still other embodiments, the camera or sensor monitors the operator after an indicator event (e.g., movement of the user's head, detection of a noise, etc.).

If the system detects that the operator's gaze has deviated from the inspection area for a predetermined period or that the operator's attention level has dropped below a preset threshold, an output signal will be generated. The signal can be used to trigger a variety of actions, including (but not limited to) sounding an alarm, flashing a light, pausing the conveyor, alerting a supervisor, and/or any other response deemed appropriate, as shown in the schematic of FIG. 5.

The disclosed system and method includes many advantages over current systems. For example, operators remain focused during manual and semi-automated visual inspection processes.

Figure 5:
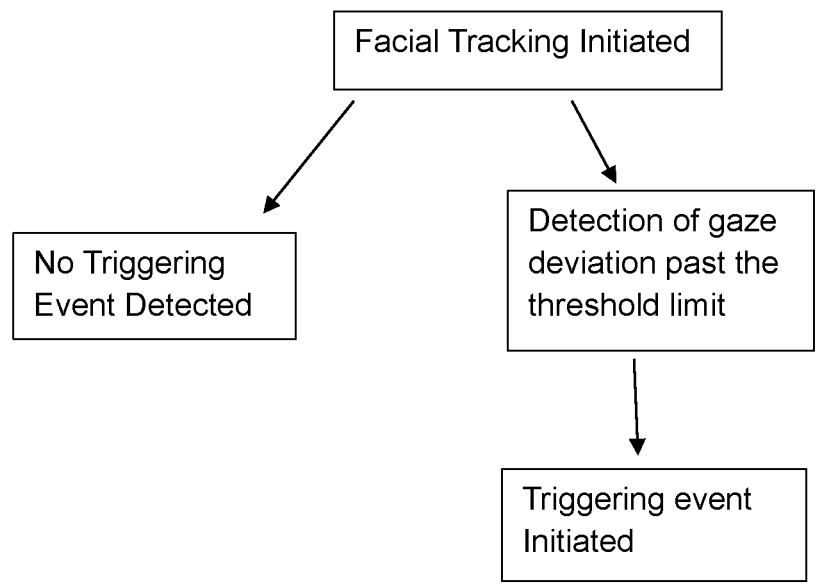
FIG. 5 is a schematic illustrating initiation of a triggering event in accordance with some embodiments of the presently disclosed subject matter.
Figure 6:
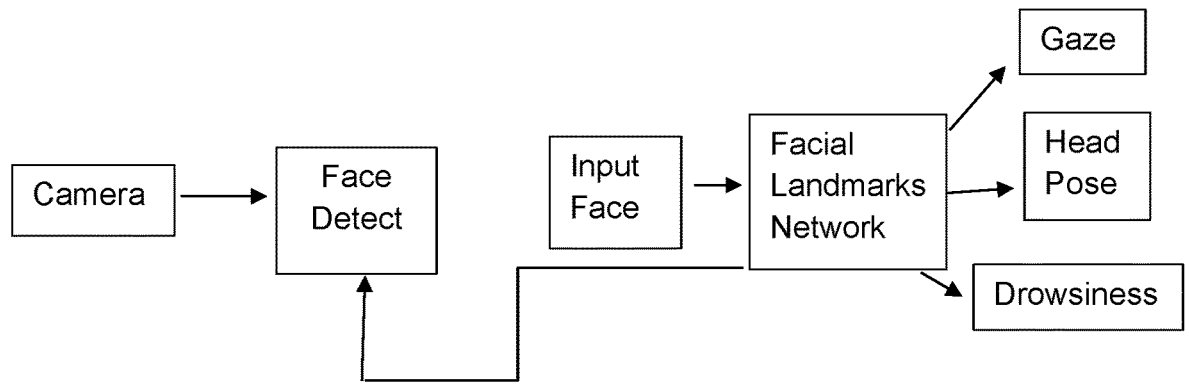
FIG. 6 is a schematic illustrating one method of use of the disclosed system in accordance with some embodiments of the presently disclosed subject matter.

In addition, continuous monitoring of the operator's engagement allows for real time intervention if an operator becomes distracted or fatigued, as illustrated in the schematic of FIG. 5.

The disclosed system and method offers enhanced reliability and effectiveness of the inspection process.

The disclosed system can be integrated into any existing or new manual or semi-automated system in a wide variety of industries (e.g., pharmaceuticals, manufacturing, quality control).

The disclosed system is adaptable, scalable, and versatile, thereby improving quality assurance in any visual inspection setting.

As described above, although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A system for operator attentiveness monitoring comprising:
   a fixed-mount camera positioned to continuously monitor the facial features of a human operator seated at a semi-automated pharmaceutical inspection machine;
   a processing unit comprising a local embedded computer, configured with a facial tracking algorithm, wherein said processing unit:
      processed image data locally to determine gaze direction, head pose, and blink rate;
      determines operator attentiveness based on predefined thresholds for facial landmark movement over time;
   wherein no image data is transmitted to a remove server;
   wherein the processing unit transmits only digital attention-state signals to a programmable logic controller (PLC) connected to the semi-automated pharmaceutical inspection machine; and
   wherein the PLC controls downstream inspection workflow based on operator attentiveness state.

2. The system of claim 1, wherein the tracking camera or tracking sensor is positioned adjacent to a ceiling in a work environment of an operator.

3. The system of claim 1, wherein the tracking camera or tracking sensor is positioned as part of a conveyor apparatus.

4. The system of claim 1, wherein the tracking camera or tracking sensor is embedded within a conveyor belt of a conveying apparatus.

5. The system of claim 1, wherein a direction of a gaze of the operator is tracked in real time, a location of the center of an eye of the operator is tracked in real time, or a torsion of an eye of the operator is tracked in real time.

6. The system of claim 1, wherein the angle of an operator's head is tracked, the position of an operator's head is tracked, and movement of the operator's face is tracked.

7. The system of claim 1, wherein the tracker includes an illumination source selected from a laser, a light emitted diode, an organic LED, or a fiber light source.

8. The system of claim 1, wherein the camera or sensor is an infrared or near-infrared camera or sensor.

9. The system of claim 1, wherein the processing unit compares captured light information with a predetermined lookup table or a predetermined eye model to estimate tracking information of the operator's eyes or face.

10. The system of claim 1, further comprising software algorithms to interpret the data from the tracking camera or tracking sensor to ascertain the direction of the operator's gaze and the level of attention being paid by the operator.

11. The system of claim 1, wherein the immediate response is based on real-time analysis of facial landmarks derived from a respective facial image of the operator.

12. The system of claim 1, configured in a manufacturing environment.

\* \* \* \* \*